US007082314B2

(12) United States Patent
Farmer et al.

(10) Patent No.: US 7,082,314 B2
(45) Date of Patent: Jul. 25, 2006

(54) INTERCOM SYSTEM

(75) Inventors: Steven Farmer, Bedfordshire (GB); Daniel Burns, Suffolk (GB)

(73) Assignee: Vitec Group Communications Limited, Cambridge (GB)

( * ) Notice: Subject to any disclaimer, the term of this patent is extended or adjusted under 35 U.S.C. 154(b) by 517 days.

(21) Appl. No.: 10/363,716

(22) PCT Filed: Sep. 10, 2001

(86) PCT No.: PCT/GB01/04033

§ 371 (c)(1),
(2), (4) Date: Mar. 7, 2003

(87) PCT Pub. No.: WO02/23932

PCT Pub. Date: Mar. 21, 2002

(65) Prior Publication Data

US 2003/0176194 A1 Sep. 18, 2003

(51) Int. Cl.
*H04B 7/00* (2006.01)
*H04Q 7/20* (2006.01)

(52) U.S. Cl. .................. 455/517; 455/520; 455/3.06; 455/463

(58) Field of Classification Search ............... 455/416, 455/445, 3.01, 3.03, 411, 412.1, 414.4, 415, 455/417, 463, 450, 452.1, 435.1, 507, 509, 455/511, 514, 517, 521, 520, 3.05, 3.06, 516, 455/455, 63.3, 79, 515; 379/88.01, 265.13, 379/265.02; 370/352, 356
See application file for complete search history.

(56) References Cited

U.S. PATENT DOCUMENTS 6,026,295 A 2/2000 Okada

FOREIGN PATENT DOCUMENTS

| EP | 0 680 190 | 11/1995 |
| EP | 0 933 915 | 8/1999 |
| GB | 2 313 251 | 11/1997 |

*Primary Examiner*—Edward F. Urban
*Assistant Examiner*—John J. Lee
(74) *Attorney, Agent, or Firm*—Nickolas E. Westman; Westman, Champlin & Kelly, P.A.

(57) ABSTRACT

A digital wireless intercom system provides voice communications between selected mobile user stations via allocated radio channels. All communications flow via channels between the mobile stations and the base station. The base station includes a crosspoint processor for setting up desired communication links between users. A data store contains data identifying the preferences of each user, including the other users with whom communication links are to be set up. On receipt of a user ID from a mobile station, a correlator in the base station correlates the particular user with the channel being used by the mobile station of the user, so that the crosspoint processor can identify the channels in use for setting up the required communication links. The correlator dynamically updates the channel allocations as channels used by any particular user change. In this way, the crosspoint processor seamlessly follows channel changes, maintaining the required communication links with particular users. Separate wireless cells can be provided and the system supports roaming of individual mobile users from one cell to another whilst maintaining the required communication set-up by the crosspoint processor.

8 Claims, 11 Drawing Sheets

FIG. 1.
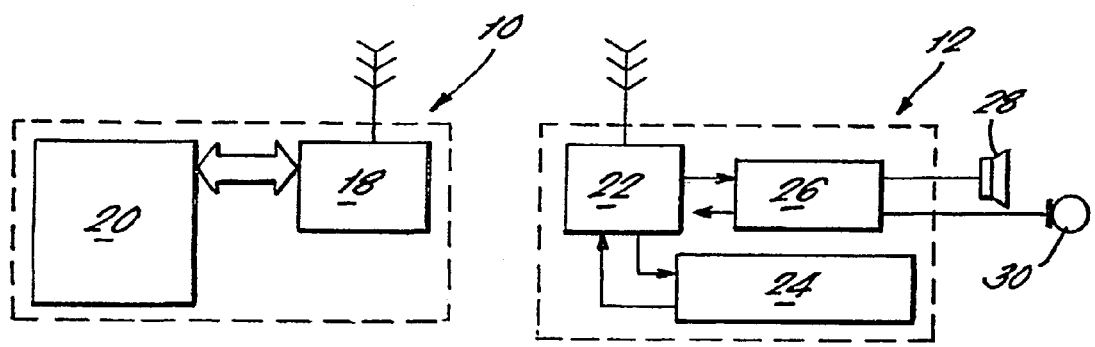
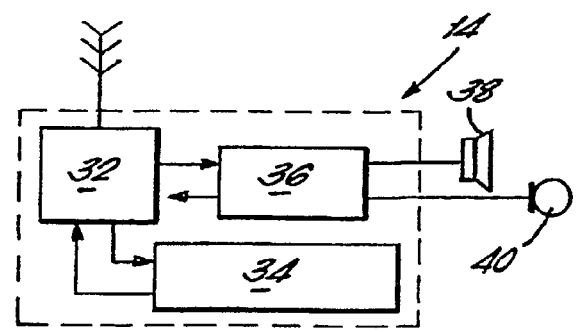
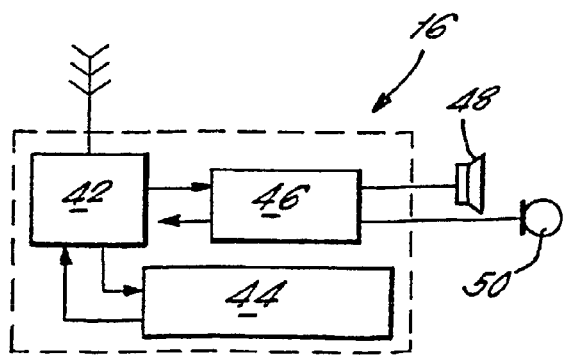

FIG. 9B.

INTERCOM SYSTEM

CROSS-REFERENCE TO RELATED APPLICATION

This Application is a Section 371 National Stage Application of International Application No. PCT/GB01/04033 filed Sep. 10, 2001 and published as WO 02/23932 on Mar. 21, 2002 in English.

FIELD OF THE INVENTION

This invention relates to intercom systems, for example such as are used in the production of television programmes to enable a producer to communicate with various other people (for example camera man) involved in producing the programme.

BACKGROUND TO THE INVENTION

Conventional intercom systems used in television studios comprise a number of mobile units connected via cables to a remote base station which coordinates audio signals to and from the mobile units. This sort of system can be inconvenient to use as a result of the constraint placed by the cables on the movements of the users of the mobile units.

Such constraints are generally not present (or are less of a problem) in a wireless intercom system, but in this case, it is only possible for communications from a given unit to be either broadcast to all mobile units simultaneously or to a selected one of the mobile units.

SUMMARY OF THE INVENTION

According to the invention, there is provided a digital wireless intercom system comprising a base station and at least three mobile units, transceiver means for sending digitally encoded wireless audio signals to one or more of the mobile units, for reception thereby, input means for receiving an audio input and converting it into such a signal prior to transmission of the signal by the transceiver means, each mobile unit having output means connected to the transceiver means and operable to convert a signal received thereby into an audio output, the base station having selection means for selecting which mobile unit is to receive digitally encoded audio signals, wherein the selection means is operable to select any number of mobile units to receive, substantially simultaneously, signals derived from the same audio input.

Thus, since each mobile unit receives digitally encoded audio signals from the base station, the units to which the signals are to be transmitted can be readily controlled by the selection means so that a given audio input can be broadcast to just one of the mobile units, to all the mobile units or to any number of mobile units between those extremes.

Thus, the invention provides an intercom system which has the advantages of wireless signal links, whilst providing flexibility of selection of mobile units to receive signals.

Preferably, the input means is provided on at least one of the mobile units, and comprises a microphone and analogue to digital converter connected to the transceiver means, the arrangement being such that the mobile unit is operable to send digitally encoded audio signals to a selected other mobile unit or units via the base station.

Preferably, the input means is also provided at a plurality of other mobile units, and accordingly comprises a respective microphone and analogue to digital converter at each of said other mobile units.

The mobile units are thus operable to establish signal links with other mobile units regardless of, and without affecting, the links already established between other mobile units, as all of these links are made via the base station. Thus, for example, if all the mobile units have established communications links, over corresponding channels, with the base station, each unit may communicate with any number of other units without increasing the number of communications channels needed, so that the number of signal links may exceed the number of channels used by the system by a considerable margin.

Preferably, the output means is operable automatically to provide an audio output at a given mobile unit in response to the selection of the unit by the selection means and the transmission of a digitally encoded audio signal to the selected mobile unit. To that end, the transceiver means may to advantage comprise a respective receiver at each mobile unit which receiver activates the output means at that mobile unit on receipt of a signal, carrying selection data identifying that unit, from the base station.

Alternatively, the system may be arranged so that the receivers are permanently active, but at any one time each receiver is operable to receive signals from the base station only over a respective channel so that said selection of mobile units is achieved by selecting which channels are to carry digitally encoded audio signals derived from a given input.

The system may to advantage include means for transmitting text and/or picture messages (composed at the base station or a mobile unit) to said selected mobile unit or units, each of which units accordingly includes a visual display.

In this case, each mobile unit may to advantage be operable to display a text or picture message on receipt thereof by the base station, and the latter may to advantage include a buffer memory for storing a text message for a selected mobile unit whilst another text message is being transmitted to or displayed-by the selected unit.

Preferably, the transceiver means, input means and output means are devices which conform to the Digital Enhanced Cordless Telecommunications standard.

The selection means may be situated at the base station and controlled by a control unit, preferably forming part of a mobile unit, and operable to transmit selection instructions to the selection means over the wireless link provided by the transceiver means. At least one of the mobile units may to advantage be operable only to transmit signals (for example as a result of having no output means). Furthermore, at least one mobile unit is preferably so arranged as to be able only to receive digitally encoded audio and/or text signals.

As some mobile units may only be needed to receive or to transmit signals, there would be no practical disadvantage in having two such units in a system, and these would give rise to the same bandwidth requirements as a single "two-way" mobile unit.

The base station may to advantage include mixing means for mixing audio signals received by two or more mobile units and transmitting those signals to a selected common mobile unit.

Preferably, the base station and mobile units have memories for storing digital signals and are so configured that the mobile units transmit signals to and receive signals from the base station only during periodic mobile unit and base station transmission intervals respectively, such that during a mobile unit transmission interval, only one mobile unit is operable to transmit signals to the base station, whilst during a base station transmission interval, only one mobile unit is operable to receive signals from the base station, the base station being operable to transmit signals to the mobile units only during periodic base station transmission intervals.

Preferably, the mobile units further comprise digital data input and output ports for transmitting digital data to and receiving digital data from equipment connected to said ports, the mobile units and base station being operable to transmit and receive signals carrying such data.

Preferably, the transceiver means comprises a respective radio frequency wireless transceiving forming part of the base station and each mobile unit.

Advantageously, the mobile units and base station are operable to transmit selection data and digital audio signals during first periodic mobile unit and base station transmission intervals, respectively, and digital audio signals and text data signals during second periodic mobile unit and base station transmission intervals, respectively. Preferably, at least one of the mobile units does not include control means for instructing the selection means on the base station, or the control means may be de-activated by means of a signal from the base station.

The invention also provides intercom apparatus comprising a base station, said apparatus being capable of selectively establishing voice communication connections among a plurality of user stations and said base station being capable of communicating with each said user station on a respective channel, said base station including:
  (i) a data store containing
    (a) respective user identification data identifying each of a plurality of users of the apparatus, and
    (b) respective personality data, for each said identified user, including the user identification data of each other user identified to have a voice connection with said identified user;
  (ii) a user and channel correlator receiving, from each said user station, data correlating with the user identification data of the respective user of the respective user station, and correlating the user identification data of the respective user with the respective channel of the user station of the respective user; and
  (iii) a cross point processor responsive to said user and channel correlator to set up voice communication links amongst said channels to provide voice connections between users in accordance with said personality data.

With this arrangement, any user station can be given the "personality data" of any user of the intercom system, particularly the data defining the required user connections. Once the user has identified him/herself (or rather his/her role or title), the apparatus correlates the particular user with the channel being used by the user station of the user, so that the user specific personality data can then be applied to the channel. This has particular advantages for radio based intercom systems as will be apparent from the following detailed description of the embodiments. The term "cross-point processor" is used here to indicate any circuit or processing unit capable of setting up and changing multiple connections between channels and is not limited to digital processing arrangements although digital processing is preferred as will be apparent in the following descriptions of examples of the invention.

BRIEF DESCRIPTION OF THE DRAWINGS

The invention will now be described, by way of illustrative example, with reference to the accompanying drawings, in which:

FIG. 1 is a block diagram of a digital wireless intercom system embodying the invention, comprising a base station and three mobile units;

FIG. 9B illustrates a full E1 data frame as may be supplied to the splitter of FIG. 9A;

FIG. 9C illustrates the E1 data frames for respective active antennae which are formed by splitting the frame of FIG. 9B.

DESCRIPTION OF THE PREFERRED EMBODIMENTS

Figure 2:
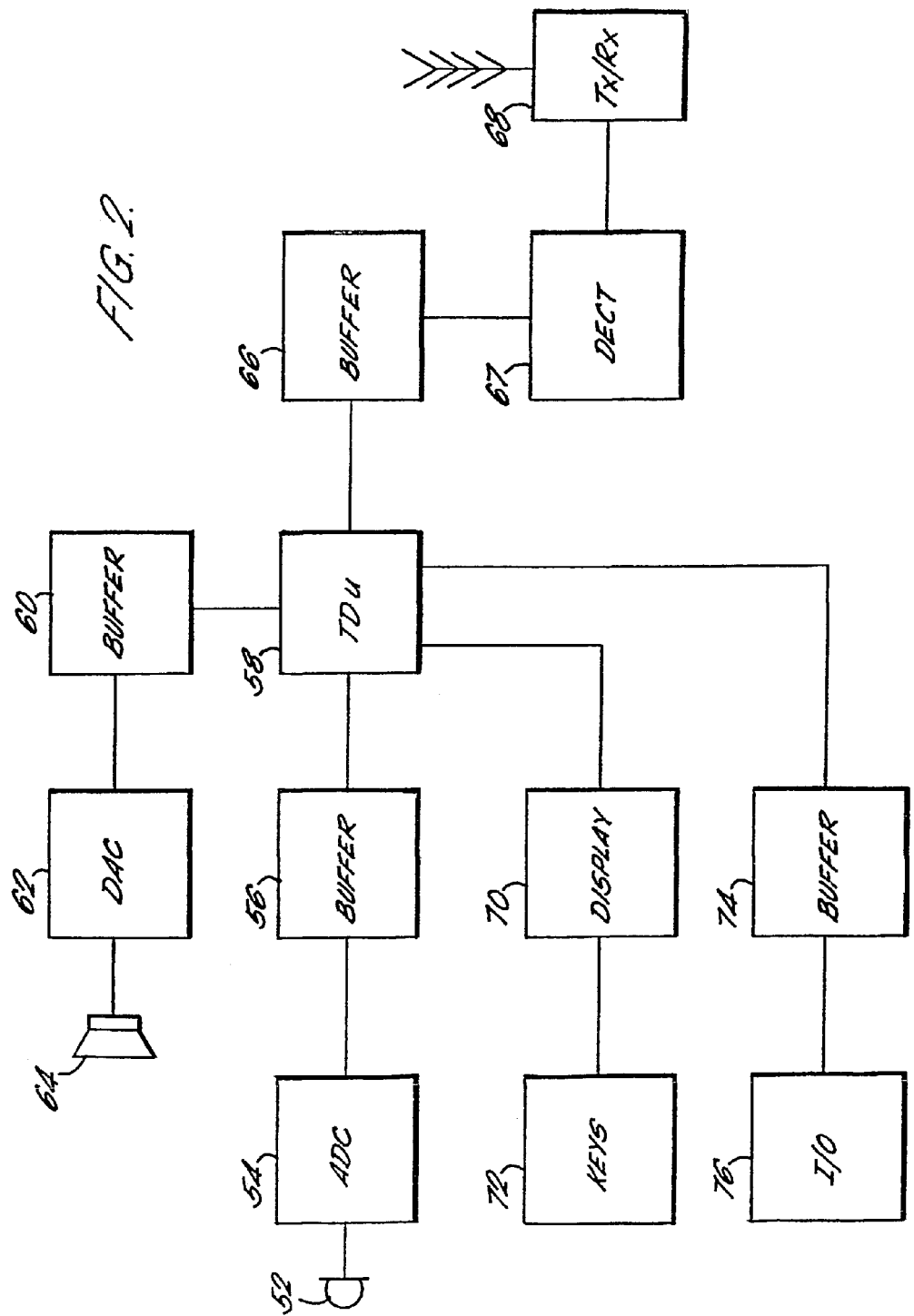
FIG. 2 is a block diagram of a mobile unit of the system of FIG. 1.

The digital wireless intercom system of FIG. 1 comprises base station 10 and mobile units 12, 14 and 16. Base station 10 comprises a radio frequency wireless transceiver 18 and a digital signal processor 20, transceiver 18 being operable to transmit signals to, and receive signals from, the mobile units only during base station and mobile unit transmission intervals respectively. Signal processor 20 is operable to store and process digitally encoded wireless audio signals and selection data.

Mobile unit 12 comprises a wireless transceiver 22, a selection data interface 24, a digital signal processor 26, a loudspeaker 28 and a microphone 30. Transceiver 22 is operable to transmit signals to, and receive signals from, base station 10 only during mobile unit and base station transmission intervals respectively. Interface 24 comprises a keypad (not shown) for entering selection data and a screen (not shown) for displaying selection data, the interface being operable to receive selection data either transceiver 22 or the keypad. Signal processor 26 is operable to digitise analogue audio signals from microphone 30, to store the digital audio signals before transmission to base station 10 and to reconstruct digital audio signals received from base station 10 as analogue audio signals to be reproduced by loudspeaker 28.

Mobile units 14 and 16 respectively comprise wireless transceivers 32 and 42, selection data interfaces 34 and 44, digital signal processors 36 and 46, loudspeakers 38 and 48 and microphones 40 and 50.

In order to speak to another user of the intercom system, a user of, for example, mobile unit 12 enters selection data using the keypad of interface 24, specifying, for example, mobile unit 14. The selection data is displayed on the screen of interface 24 and signal processor 26 starts to digitise analogue audio signals from microphone 30. The resulting digital audio signals are stored by signal processor 26 until a mobile unit transmission interval allocated to mobile unit 12, during which transceiver 22 transmits the selection data and stored digital audio signals to base station 10.

The selection data and digital audio signals are received by transceiver 18 and stored by signal processor 20, which has a digital audio signal memory location and a selection data memory location allocated to each mobile unit in the intercom system. The selection data memory location allocated to each mobile unit stores a list of the mobile units that have transmitted selection data specifying that mobile unit. Signal processor 20 sums the digital audio signals received from mobile unit 12 with the digital audio signals (if any) already stored in the memory location allocated to mobile unit 14. Signal processor 20 generates data indicating that mobile unit 14 has been specified in the selection data of mobile unit 12. During a base station transmission interval allocated to mobile unit 14 the summed digital audio signals stored in the memory location to mobile unit 14, and data indicating mobile unit 12 are transmitted to mobile unit 14.

The summed digital audio signals and the data indicating mobile unit 12 are received by transceiver 32 of mobile unit 14. The data indicating mobile unit 12 is transmitted to interface 34 and displayed upon the screen thereof to indicate to the user that mobile unit 14 is receiving signals from mobile unit 12. The digital audio signals are transmitted to signal processor 36, at which they are reconstructed as analogue audio signals and reproduced by loudspeaker 38.

If the user of mobile unit 14 wishes to speak to the user of mobile unit 12, the process of establishing a signal channel between mobile units 14 and 12 is as described above for mobile unit 12.

Alternatively, the user of, for example, mobile unit 12 may establish a two-way signal channel with, for example, mobile unit 14 by entering selection data specifying both mobile units 12 and 14. The selection data is displayed upon the screen of interface 24, transmitted to base station 10 during a mobile unit transmission interval allocated to mobile unit 12 and stored by signal processor 18. The selection data specifying mobile unit 14 is stored in the selection data memory location allocated to mobile unit 12 and the selection data specifying mobile unit 12 is stored in the selection data memory location allocated to mobile unit 14. The selection data is transmitted to mobile unit 14 by base station 10 during a base station transmission interval allocated to mobile unit 14, at which the selection data is displayed on the screen interface 34 to indicate to the user that mobile unit 14 is operable both to transmit signals to, and receive signals from, mobile unit 12. The operation of mobile unit 14 is then the same as if the user thereof had entered selection data specifying mobile unit 12 using the keypad of interface 34.

The mobile unit of FIG. 2 comprises a microphone 52, an analogue to digital converter (ADC) 54, an audio input buffer memory 56, a time division multiplexer (TDM) 58, an audio output buffer memory 60, a digital to analogue converter (DAC) 62, a loudspeaker 64, a transceiver buffer memory 66, a Digital Enhanced Cordless Telephone (DECT) chipset 67, a radio frequency wireless transceiver 68, a display screen 70, a selection data keypad 72, a digital data buffer memory 74 and a digital data input/output (I/O) port 76.

Figure 3:
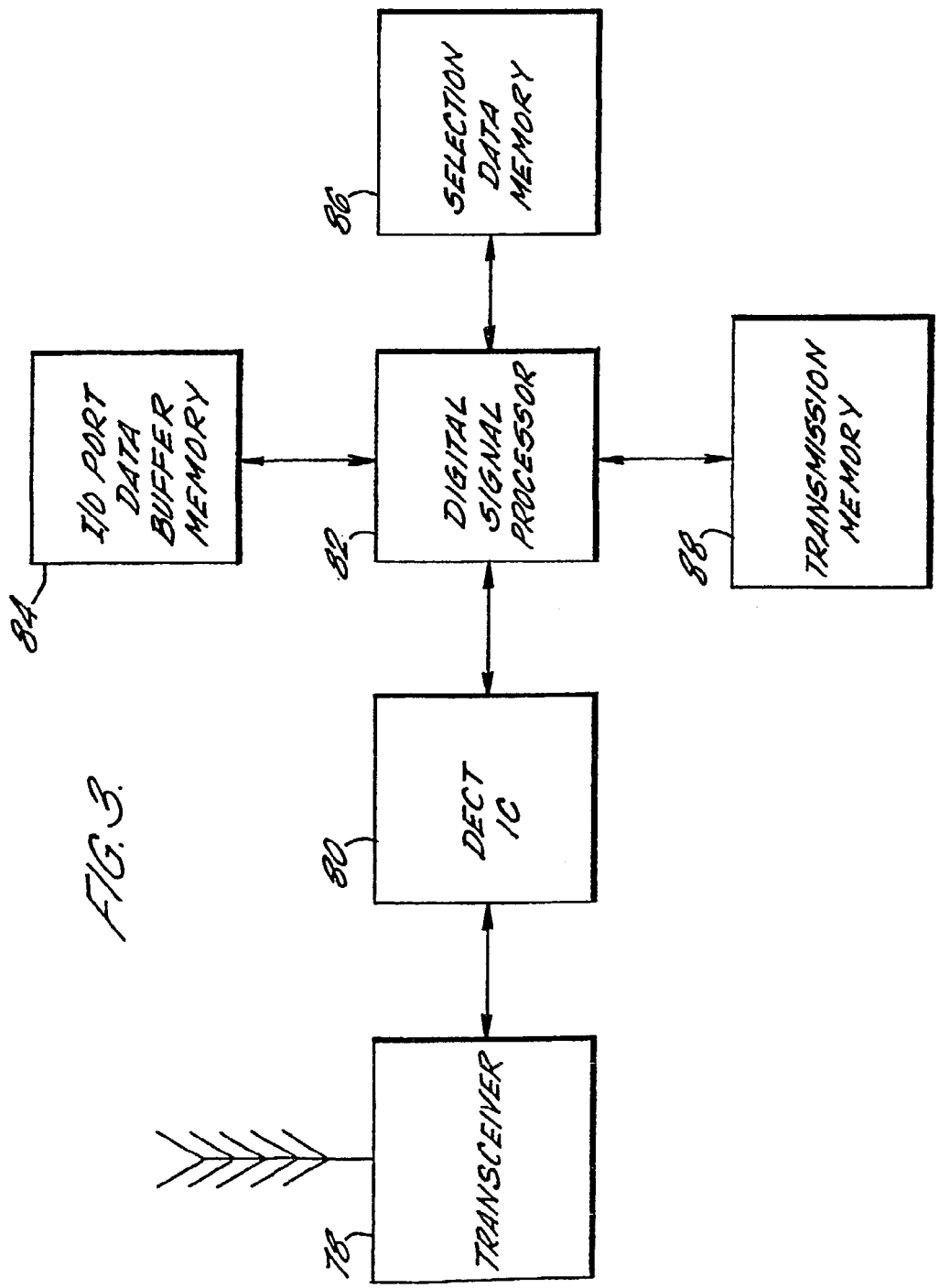
FIG. 3 is a block diagram of the base station of the system of FIG. 1.

The base station of FIG. 3 comprises a wireless transceiver 78, a DECT chipset 80, a digital signal processor 82, a data buffer memory 84, a selection data memory 86 and a transmission memory 88.

In the following description the operation of the mobile units and base station are described for the purpose of simplicity in terms of a single transmission frequency. It will be appreciated that the DECT chipset in fact uses ten frequencies simultaneously, such that in addition to the base station the intercom system can comprise up to sixty mobile units capable of transmitting signals to and receiving signals from the base station.

The operation of the mobile unit of FIG. 2 will now be described in detail. It is assumed that the user of the mobile unit has entered selection data specifying at least one other mobile unit. Analogue audio signals from microphone 52 are continuously digitised by ADC 54 and the resulting digitally encoded audio signals are stored by buffer memory 56. Digitally encoded audio signals stored by buffer memory 60 are continuously reconstructed by DAC 62 as analogue audio signals, which signals are reproduced by loudspeaker 64. Assuming that an item of digital equipment is connected to I/O port 76, digital data signals are either continuously transmitted from I/O port 76 to data buffer memory 74 or continuously transmitted from data buffer memory 74 to I/O port 76.

DECT chipset 67 constrains transceiver 68 to transmit signals to, or receive signals from, the base station only during two mobile unit transmission intervals and two base station transmission intervals, respectively, allocated to the mobile unit. The two mobile unit and two base station transmission intervals form part of a periodic transmission frame of twelve mobile unit transmission intervals followed by twelve base station transmission intervals. The two mobile unit and two base station transmission intervals are separated by ten transmission intervals, such that if, for example, the mobile unit is allocated the eleventh and twelfth mobile unit transmission intervals in each transmission frame, it will therefore also be allocated the eleventh and twelfth base station transmission intervals.

The operation of the mobile unit during a single transmission frame will now be described using the above example of a mobile unit that transmits signals to the base station during the eleventh and twelfth mobile unit transmission intervals, and receives signals from the base station during the eleventh and twelfth base station transmission intervals. During the first five mobile unit transmission intervals of each transmission frame transceiver buffer memory 66 transmits digitally encoded audio signals and any digital data signals and selection data received during the eleventh and twelfth base station transmission intervals of the previous transmission frame to TDM 58. TDM 58 routes the digitally encoded audio signals to audio output buffer memory 60, routes any digital data signals to data buffer memory 74 and any text and/or picture messages and/or selection data to display screen 70.

During the second five mobile unit transmission intervals of each transmission frame the digitally encoded audio signals stored in audio input buffer memory 56 are transmitted to TDM 58 which transmits them to transceiver buffer memory 66. If any new selection data is entered upon selection data keypad 72 the selection data is transmitted to TDM 58 and the selection data on display 70 is amended accordingly. Digital data from data I/O port 76 stored in data buffer memory 74 is transmitted to TDM 58. TDM 58 routes the digital data signals to transceiver buffer memory 66 once all the digitally encoded audio signals and any selection data have been transmitted. The signals and selection data are stored in transceiver buffer memory 66 as two data packets, the first comprising compressed digital audio signals and any selection data, and the second comprising compressed digital audio signals and the digital data signals.

During the eleventh and twelfth mobile unit transmission intervals transceiver 68 transmits the first and second data packets, respectively, to the base station.

The operation of the base station of FIG. 3 will now be described in detail. During the twelve mobile unit transmission intervals wireless transceiver 78 receives compressed digital audio signals and any digital data signals and/or selection data, which are transmitted to DECT chipset 80. DECT chipset 80 transmits the compressed digital audio signals to signal processor 82. Any digital data signals are transmitted to data buffer memory 84 and any selection data to selection data memory 86.

Selection data memory 86 contains a location corresponding to each mobile unit in the intercom system. Each location stores a list of the mobile units specified in the selection data of the mobile unit corresponding to that location.

Transmission memory 88 and I/O port buffer memory 84 each contains a location corresponding to each mobile unit. Each location in transmission memory 88 stores compressed digital audio signals, and each location in I/O port buffer memory 84 stores digital data that are to be transmitted to the mobile unit corresponding to those locations.

When DECT chipset 80 has transmitted the compressed digital audio signals from a particular mobile unit to signal processor 82, signal processor 82 addresses selection data memory 86 to examine the location corresponding to the particular mobile unit. For each mobile unit listed in the location in turn signal processor 82 addresses transmission memory 88 to examine the location corresponding to that mobile unit. If the location already contains compressed digital audio signals signal processor 82 decompresses both the compressed digital audio signals already stored in the location and the compressed digital audio signals received from DECT chipset 80. The decompressed signals are summed then compressed and the compressed summed signals stored in the location. If, on the other hand, the location does not already contain compressed signals the compressed digital audio signals received from DECT chipset 80 are simply stored in the location.

For each mobile unit listed in the location in selection data memory 86 signal processor 82 transmits the digital data signals (if any) to the location in I/O port buffer memory 84 corresponding to that mobile unit.

At the end of the twelfth mobile unit transmission interval signal processor 82 addresses selection data memory 86 to establish whether the selection data generated by the first mobile unit have changed since the previous transmission frame. If the selection data have changed they are transmitted to signal processor 82. Signal processor 82 addresses transmission memory 88, which transmits the compressed audio signals from the location corresponding to the first mobile unit to the signal processor.

Signal processor 82 assembles the selection data (if any) and a portion of the compressed audio signals into a first data packet and transmits the first data packet to DECT chipset 80. DECT chipset 80 transmits the first data packet to transceiver 78 during the first base station transmission interval, which transmits the data packet to the first mobile unit. In the meantime signal processor 82 addresses I/O port buffer memory 84 to establish whether the location corresponding to the first mobile unit contains any digital data. If the location contains digital data a block of the data is transmitted to signal processor 82, which assembles a second data packet comprising the remainder of the digital audio signals from the location in transmission memory 88 corresponding to the first mobile unit and the digital data (if any).

This process is repeated for the five other mobile units receiving signals from the base station during the transmission frame.

Figure 4:
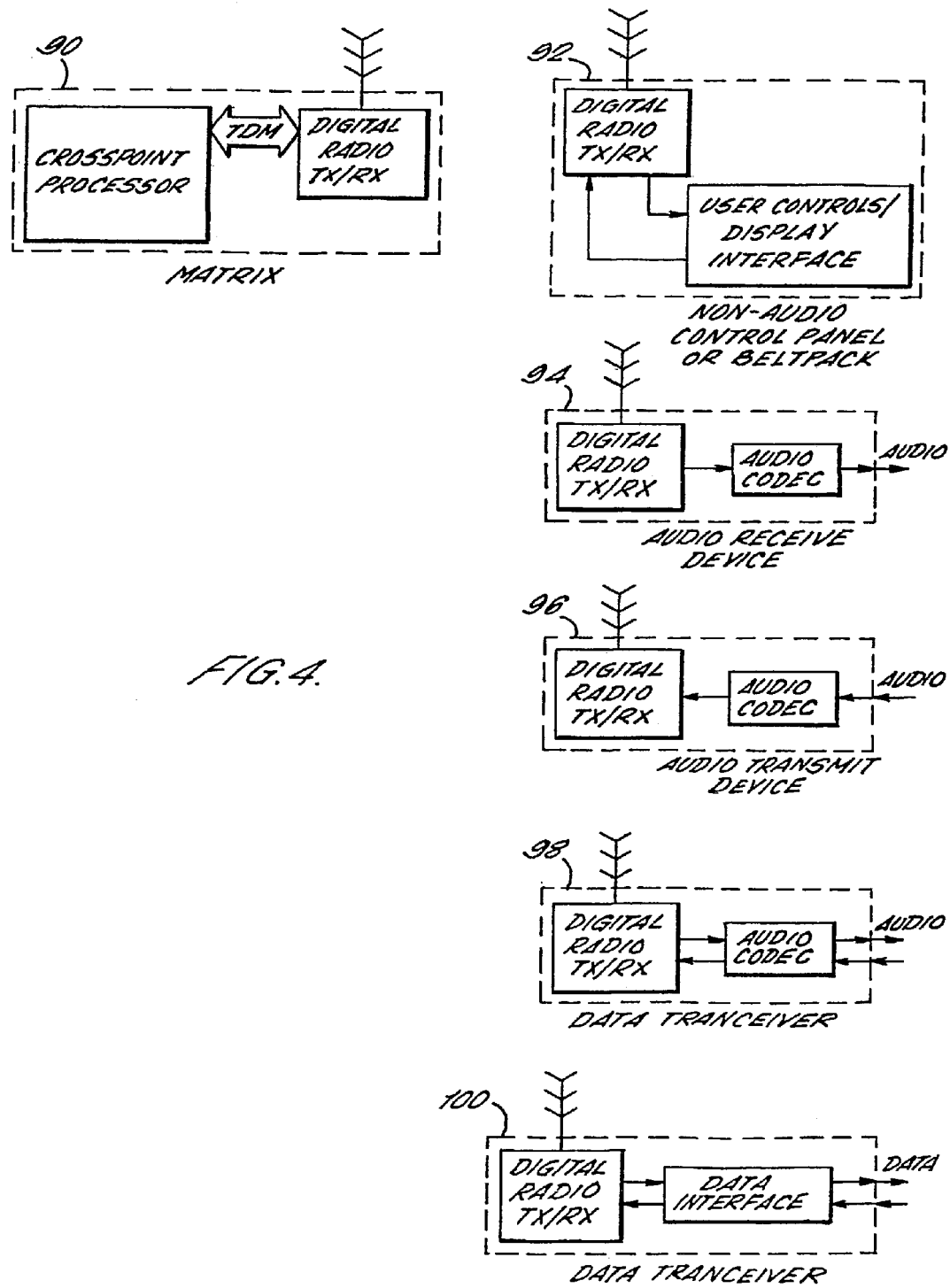
FIG. 4 is a block diagram of a digital wireless intercom system illustrating different possible embodiments of the mobile units.

The intercom system of FIG. 4 comprises a base station 90, a non-audio control mobile unit 92, an audio receive mobile unit 94, an audio transmit mobile unit 96, an audio transceiver mobile unit 98 and a data transceiver mobile unit. FIG. 4 does not represent a practical intercom system but serves to illustrate the range of different types of mobile unit that may be used within an intercom system in accordance with the invention.

The base station 90 is as described previously.

Non-audio control mobile unit 92 may take the form of a control panel at which the user may sit, or a belt pack that the user carries on his person. Non-audio control mobile unit 92 would be used to configure the intercom system by establishing the required signal channels between the other mobile units. In an intercom system comprising one or more non-audio control mobile units the other mobile units would either not have selection keypads fitted or their selection keypads would be disabled.

Audio receive mobile unit 94 might be used in a television studio, for example, by a cameraman who needs to receive instructions from the director during filming, but does not need to reply.

Audio transmit mobile unit 96 might be used by the presenter of a television programme to relay his voice to a sound recordist.

The audio transceiver is as described previously.

The data transceiver might be used to operate equipment such as cameras or lights by remote control, or to operate an autocue.

The use of the audio receive mobile unit in the intercom system means that an audio transmit mobile unit may also be used, transmitting during the two mobile unit transmission intervals that would otherwise be allocated to the audio receive mobile unit. Thus the intercom system may have more users than would be possible if all users used audio transceiver mobile units but some users needed only either to transmit or receive.

Figure 5:
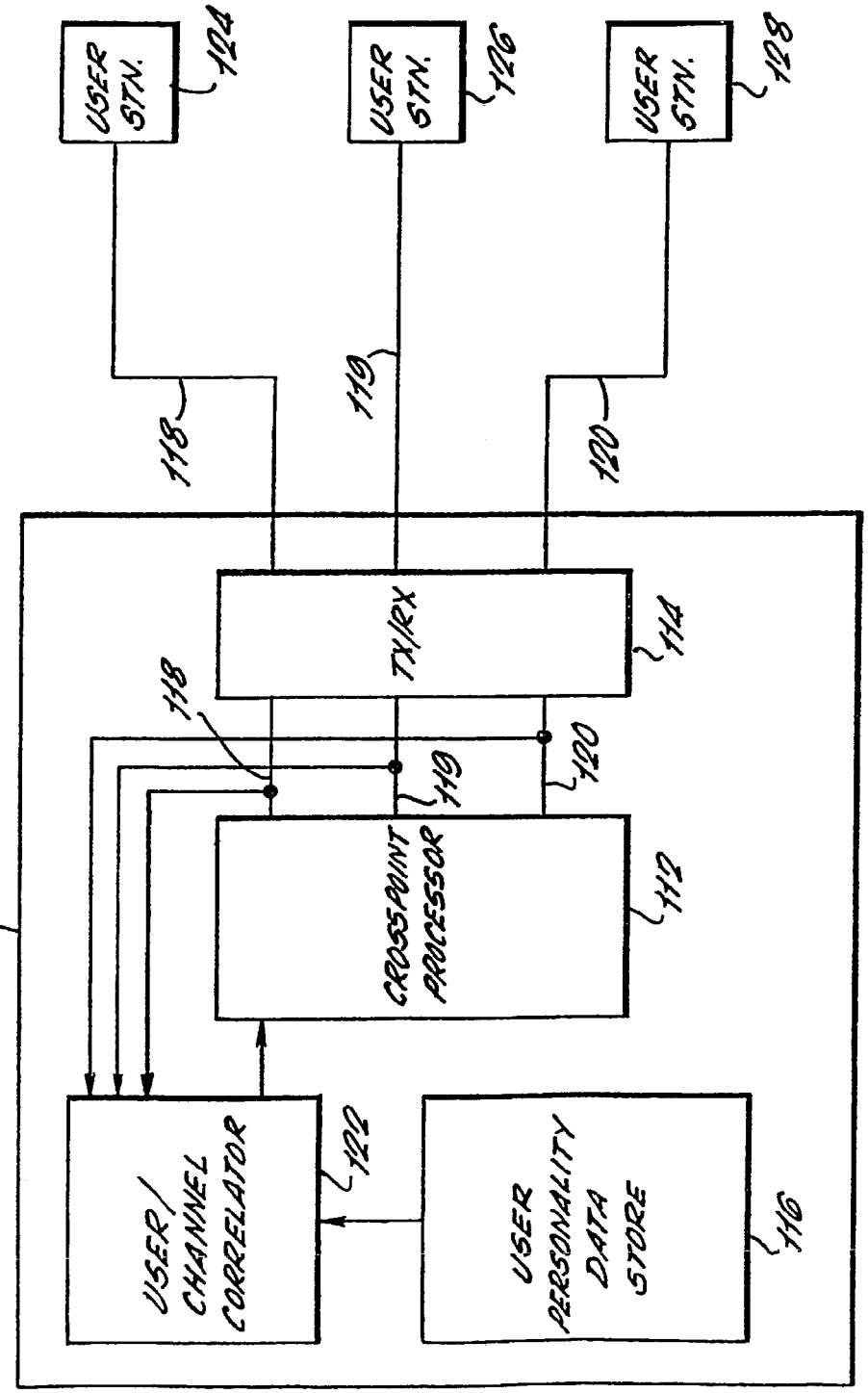
FIG. 5 is a simplified block diagram illustrating the essential functionality of a digital intercom system embodying the invention.

FIG. 5 is a functional block diagram illustrating an embodiment of the invention. A base station 101 provides voice communication links with a number of user stations of which three are illustrated at 124, 126 and 128. The communication links are provided over respective channels 118, 119 and 120 via a transceiver unit 114 in the base station 101. The channels 118, 119 and 120 may be provided by cables, but in a preferred embodiment, the communication channels are radio channels. The communication channels may provide digital links between the user stations and the base station 101 capable of carrying a duplex voice channel for each user station, together with control data. In other arrangements the voice channels may be analogue.

It may be noted that all voice communication links are between the base station 101 and the respective user stations and there are no direct communication links between user stations.

Within the base station 101, connections between user stations are provided by a cross point processor 112 which enables voice data on any one of the channels 118, 119 and 120 to be applied to a selected one or both of the other channels. The various voice communication connections made by the cross point processor 112 are controlled in accordance with data contained in a user personality data store 116. The intercom apparatus described is intended particularly for use by a group of users, each of which may have predefined preferences. These preferences will include the identity of each other user with whom the user has to communicate, as well as other personal preferences such as volume settings and other parameters. For example, the intercom may be used in a TV studio environment, whereupon the users may comprise the producer and various studio/production staff, such as cameramen, sound engineers etc. Each such user will have different standard requirements associated with their role. For example the producer may require to be heard over the intercom by all other users, whereas, at the other end of the scale, junior production staff may require only to receive instructions. Thus, in general the users will have predefined requirements and settings according to their role, and these requirements and settings are referred to as the "personality data" of the user.

Referring again to FIG. 5, the store 116 contains the personality data of the various users of the intercom apparatus within the appropriate environment. Accordingly, the personality data of each user is contained in the storage 116 in association with identification data for that user.

A feature of this embodiment of the invention is that any particular user of the intercom apparatus need not be permanently associated with a respective communication channel between the base station 101 and the user stations. When a particular user activates any one of the user stations 124 to 128, the user can first signal to the base station the identification of the user, e.g. by an appropriate keypad selection at the user station. This identification data is received by the base station 101 over an appropriate one of the communication channels 118 to 120 and is received in the base station 101 by a user/channel correlator 122. A function of the user/channel correlator 122 is to correlate the identification data of a particular user with the communication channel over which that data has been received, thereby enabling correlation of the particular user with one of the available communication channels between the base station and user stations.

The personality data contained in the store 116 can then be associated, by the correlator 122, with the particular channel from the bases station 101 on which the respective user's identification data has been received. The cross point processor 112 is then set up to ensure that the channel now associated with the particular user is given the correct connections to other channels associated with other users of the intercom system.

Importantly, this facility enables the cross point processor 112 to be set up dynamically, independently of which user operates which user station. More importantly, if the communication links between the base station 101 and user stations are by means of digital radio channels, the individual channels allocated to each user station can also be dynamically allocated, since the base station 101 functions to identify the particular user on any dynamically allocated channel, and re-assign the channel connections in the cross point accordingly.

Figure 6:
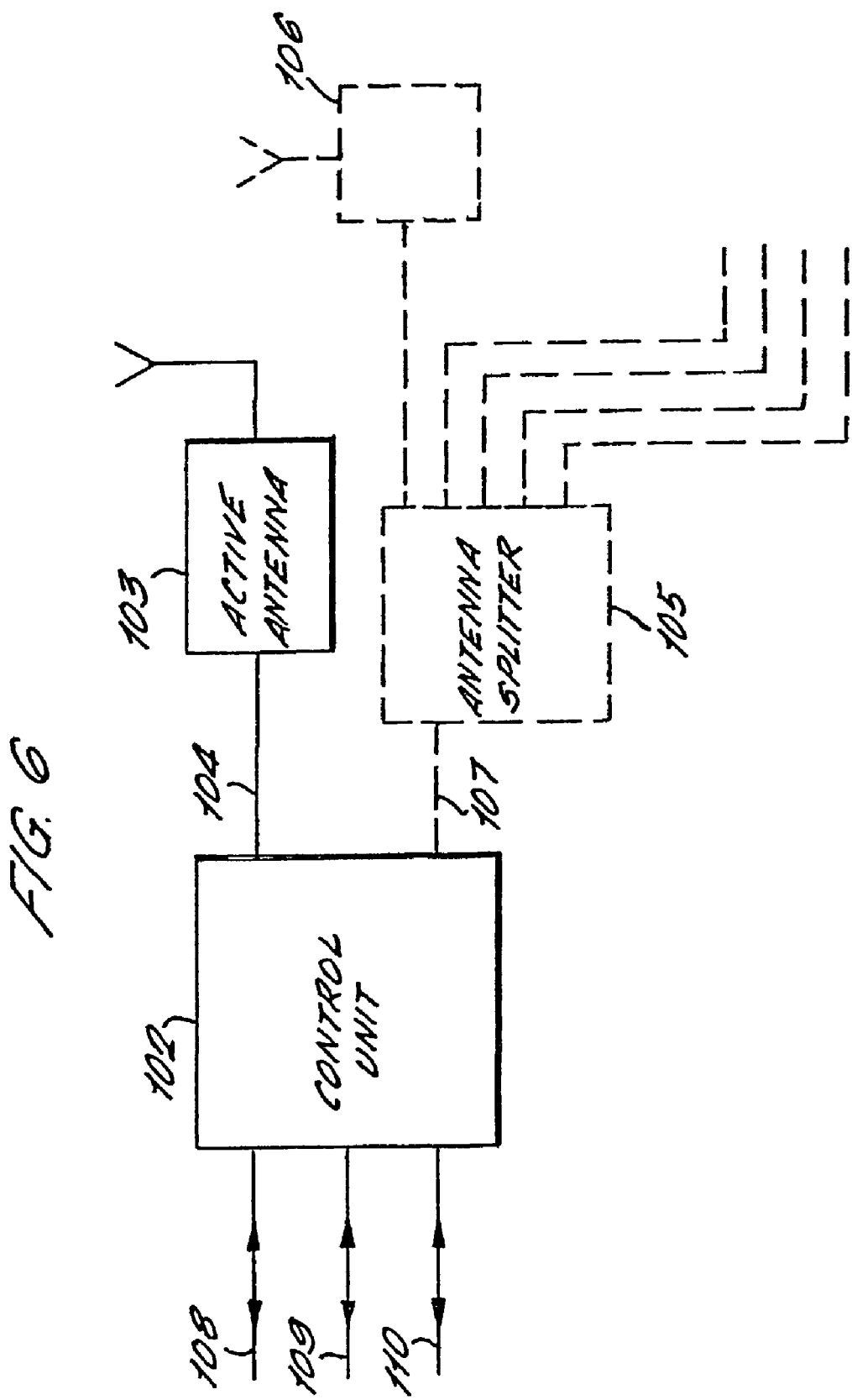
FIG. 6 is a block diagram illustrating the base station of the system of FIG. 5 in more detail.

FIG. 6 is a block diagram showing the base station 101 in slightly more detail. The base station includes a control unit 102, essentially providing the functionality described above, connected to an active antenna 103. The active antenna 103 may provide a number of digital communication channels with respective user stations, for example employing the DECT standard. Thus the connection 104 between the control unit 102 and the active antenna 103 may provide a number of communication channels corresponding to the number of user stations which can be supported by the active antenna 103.

In order to increase the number of user stations supported by the control unit 102, the unit 102 may be connected to an antenna splitter 105 capable of sporting a number of separate active antennae 106. Then, if each active antenna can support m individual user stations, and the antenna splitter can support n active antennae, the connection 107 between the control unit 102 and the antenna splitter 105 represents mn communication channels. The control unit 102 of the base station 101 may also provide for additional trunk and control connections on lines 108, 109 and 110. These connections may enable the base unit to be connected with other base units to form a network, with each base unit in the network handling communication links with associated user stations.

Figure 7:
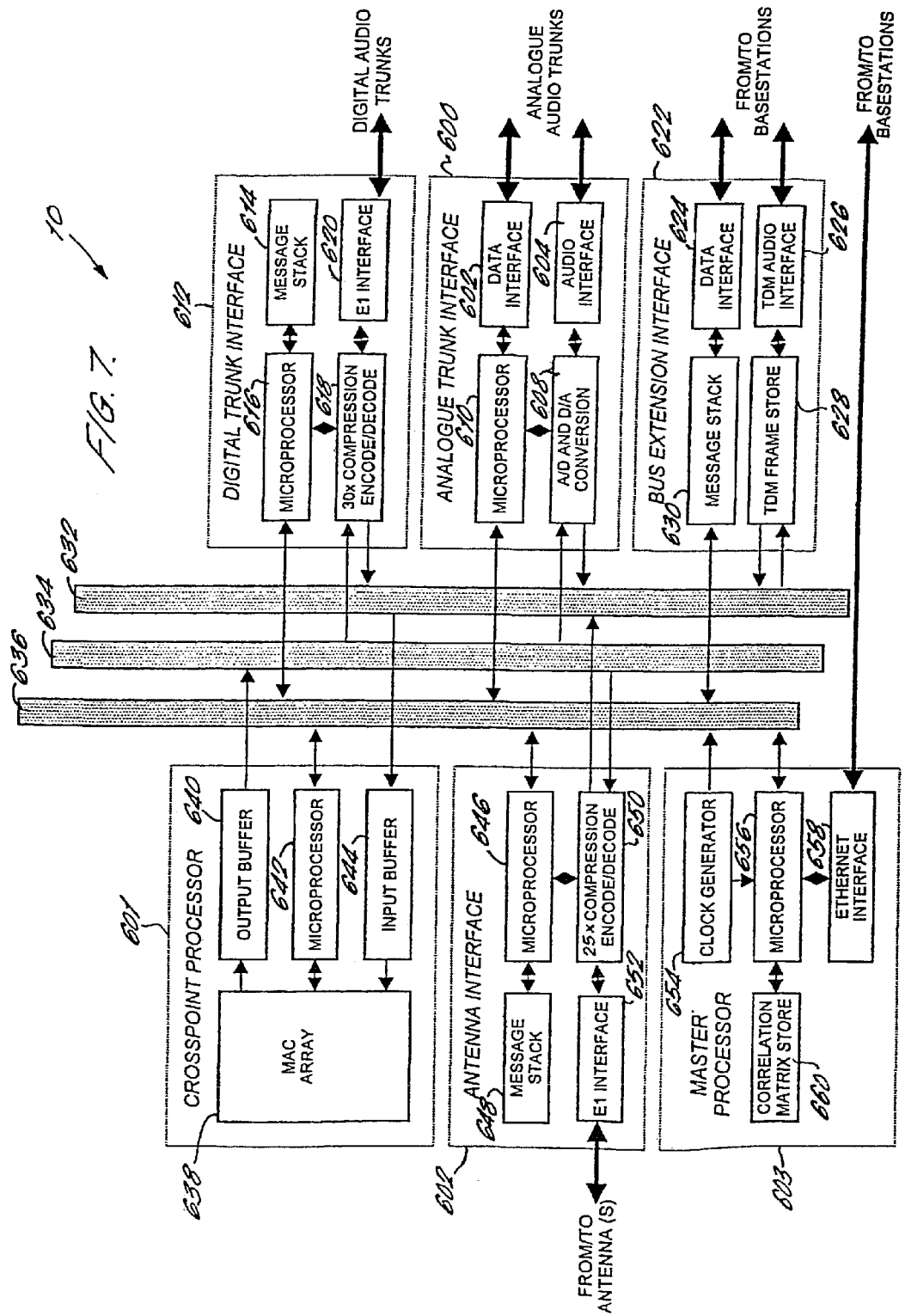
FIG. 7 is a detailed block diagram of the base station control unit.

FIG. 7 is a block schematic diagram illustrating a control unit 102 of a base station 101. The control unit incorporates an input data bus 632, an output data bus 634 and a control data bus 636. The buses 632, 634 and 636 are Time Division Multiplex (TDM) buses having sufficient individual time slots to accommodate the number of user stations on the intercom system.

The control unit comprises cross point processor 601, antenna interface 602, and master processor 603, all of which are connected to the TDM buses 632, 634 and 636.

The antenna interface 602 includes a compression codec 650 connected to the input and output TDM buses 632 and 634, a microprocessor 646 connected to the control bus 636 and associated with a message stack 648. The codec 650 is in turn connected to an E1 interface 652 for interfacing with an individual active antenna 103 or a number of active antennas via an antenna splitter 105 (see FIG. 6). The E1 interface 652 supports a standard 2.048 Mb/s E1 link providing a TDM digital link with 32 time slots. As will be explained later, each antenna interface 602 with a single E1 interface 652 can carry a maximum of 25 communication channels with respective user stations. The codec 650 encodes data for these 25 channels from the output bus 634 and decodes data from these channels for application to the input bus 632. Importantly, each channel is associated with a particular time slot on the buses 632, 634 and 636.

Each of the channels communicating with a particular user station includes control data as well as voice data. The control data received from each user station on a respective channel is extracted by the codec 650 and passed to microprocessor 646 for application as appropriate on the control bus 636. The control or message data from a particular user is buffered by the microprocessor 646 in a message stack 648.

Crosspoint processor 601 comprises a multiply and accumulate (MAC) array 638 connected to the input and output buses 632 and 634 via input and output buffers 644 and 640. A microprocessor 612 receives control data on the control bus 636 and controls the MAC array 638 to provide the required crosspoint functionality to establish the necessary voice communication links between the users of the system. The master processor 603 comprises a clock generator 654 providing a system clock, a microprocessor 656 connected to the control bus 636, and a correlation matrix store 660. The master processor 603 provides the functionality of the user personality data store 16 and user/channel correlator 22 illustrated in FIG. 5. Thus, the microprocessor 656 provides the necessary control information to the crosspoint processor 601 to establish the required voice communication links. Each output applied by the crosspoint processor to the output bus 634 can have a mix of any combination of inputs from the input bus 632. The microprocessor 642 instructs the MAC array 638 to load the appropriate digital samples from the input buffer 632 and multiply each by a unique coefficient derived from the personality data in the correlation matrix 660. The results are accumulated in the location in the output buffer 640 associated with the required output slot.

The function of an active antenna which can be connected to the active antenna interface 602 will now be described with reference to FIG. 8A. The active antenna includes an E1 antenna interface 702 to handle E1 data frames in association with the antenna interface of the control unit 102. A standard frame is illustrated in FIG. 8B. As known in the art, an E1 frame comprises 32 time slots S0 to S31. Slots S0 and S16 are reserved for synchronisation and link control signalling. Thus, 30×64 Kb/s slots are available for communication use. The active antenna, however, only uses the first six slots of the E1 frame, of which one (the sixth) time slot is used for control signalling between the active antenna and the control unit. This signalling between the active antenna and the control unit allows the active antenna to up date the base station with the status of the user stations with which the active antenna is in communication. For example, the active antenna would inform the control unit if a user station requests a change of channel, as will be explained later. Accordingly, an active antenna 700 can support five user stations, providing five channels (Ch1 to Ch5) on each of slots S1 to S5 of the E1 data frame. Each individual channel allocated to a respective user station contains a mix of audio and control data transmitted between the user station and the base station.

Figure 8A:
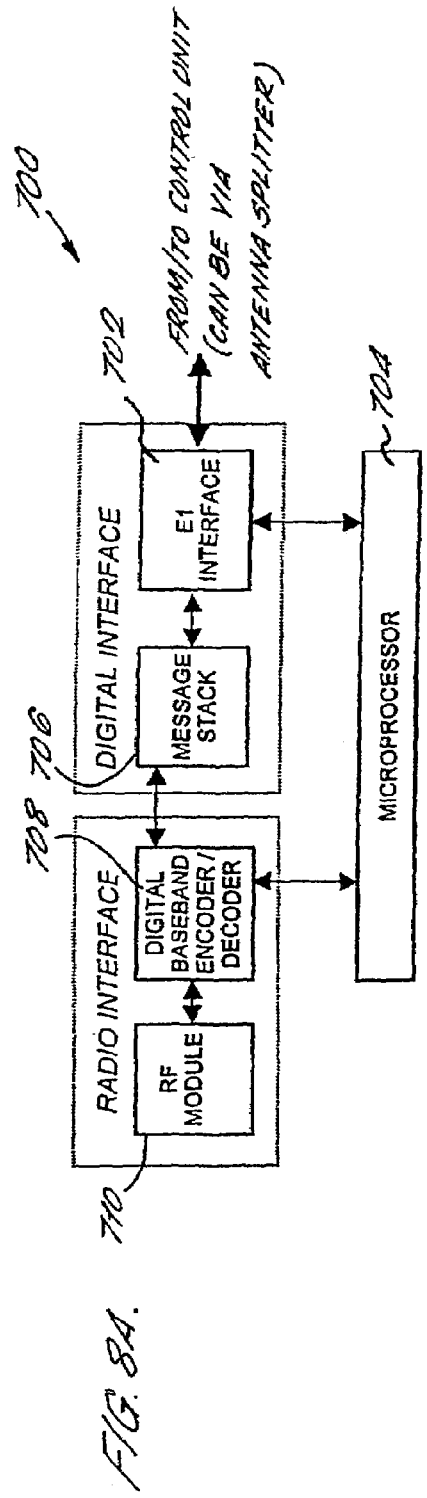
FIG. 8A is a block diagram of an active antenna.
Figure 8B:
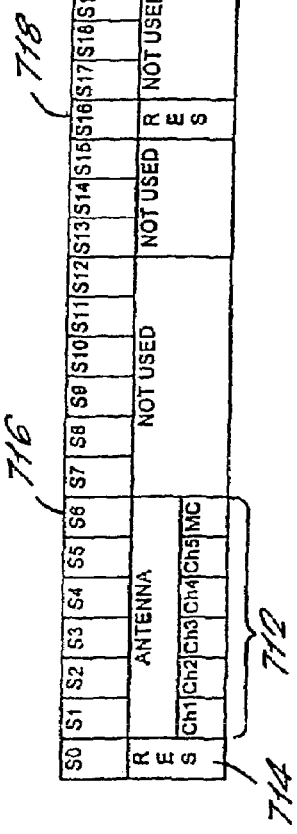
FIG. 8B illustrates an E1 digital data frame.

Referring to FIG. 8A, the E1 interface is connected to a message stack 706, further connected with a digital base band codec 708. The codec 708 provides interface with an rf module 710 for transmitting and receiving the required radio signals to establish the channels to the five user stations. The codec 708 and E1 interface 702 are controlled by a microprocessor 704. The message stack 706 provides buffering between the codec 708 and the E1 interface 702.

Figure 9A:
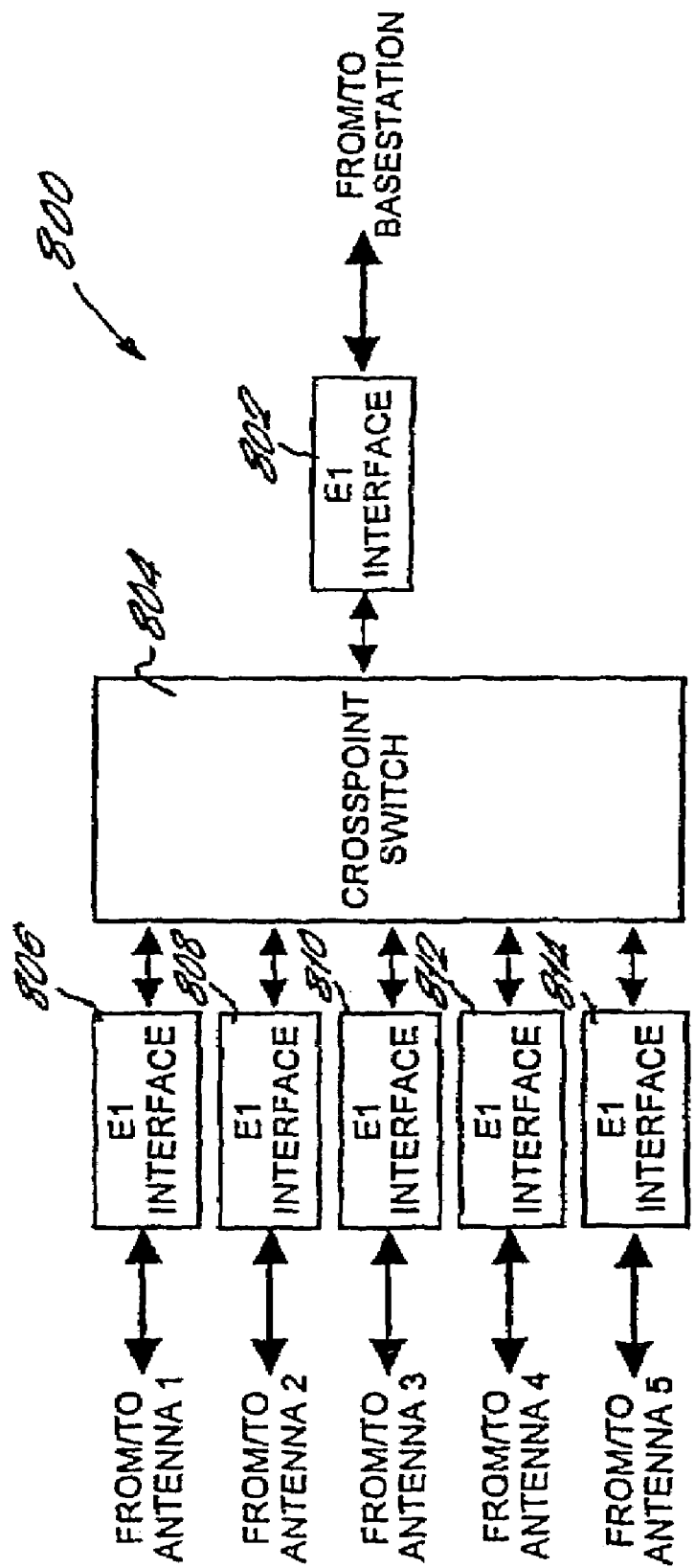
FIG. 9A is a block diagram of an antenna splitter.
Figure 9B:
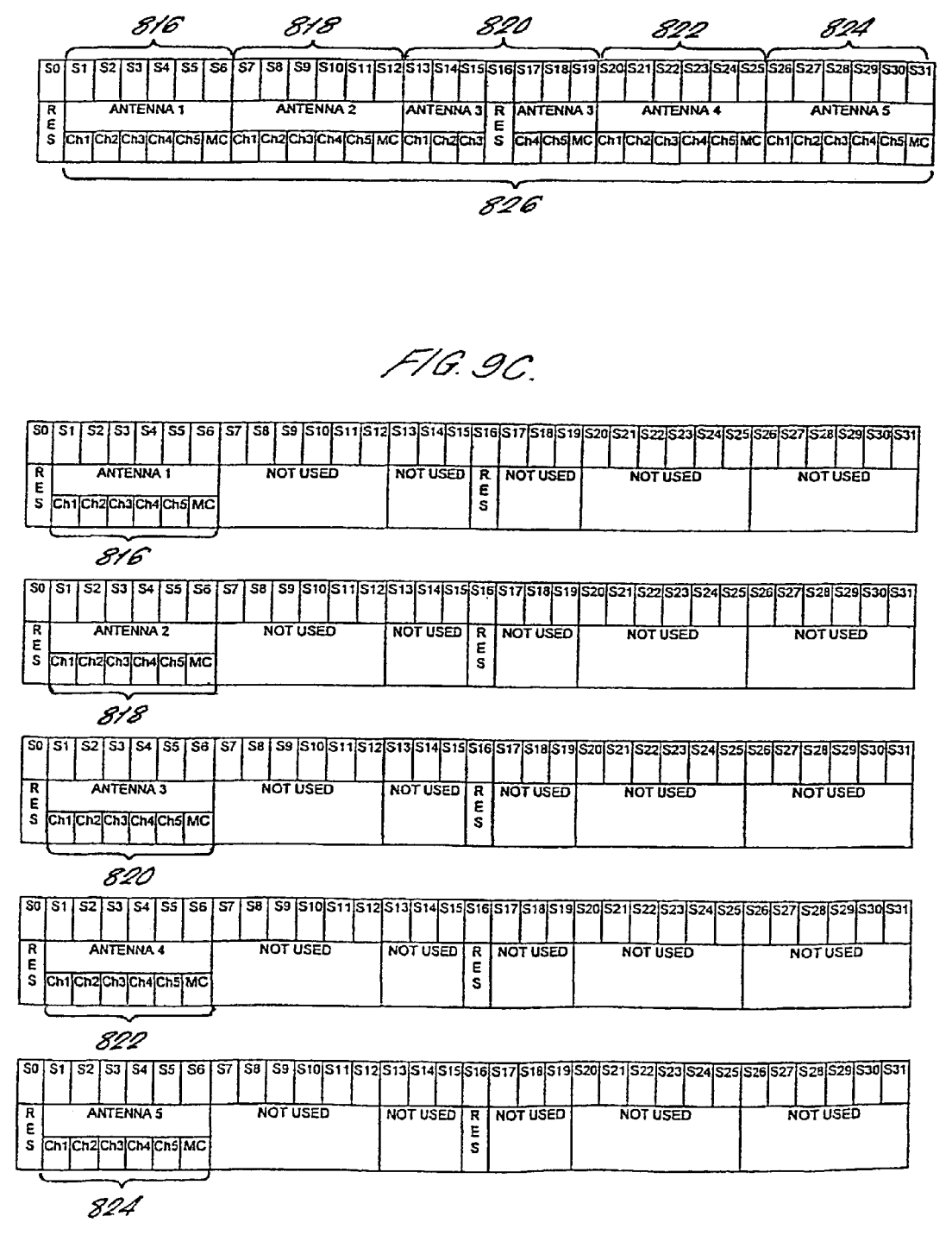

FIGS. 9A, 9B and 9C illustrate an antenna splitter 800 which may be connected to antenna interface 602 of the control unit, to provide more than the basic five channels for communication with respective user stations. The antenna splitter 800 has a crosspoint switch 804 which re-assigns time slots of a full E1 frame 826 (FIG. 9B) to provide five E1 frames as illustrated in FIG. 9C, each of which is then assigned to a respective antenna of the kind illustrated in FIG. 8A, via respective E1 interfaces 806, 808, 810, 812, 814. In each case, a respective block of six time slots of the full frame 826 is re-assigned to occupy the first six time slots of the frame assigned to the respective antennae.

With this arrangement, all five blocks of time slots in a full E1 frame generated by the codec 650 of an antenna interface 602 may be used for respective user station channel data, so that a single antenna interface 602 can establish communication with up to 25 user stations.

Figure 10:
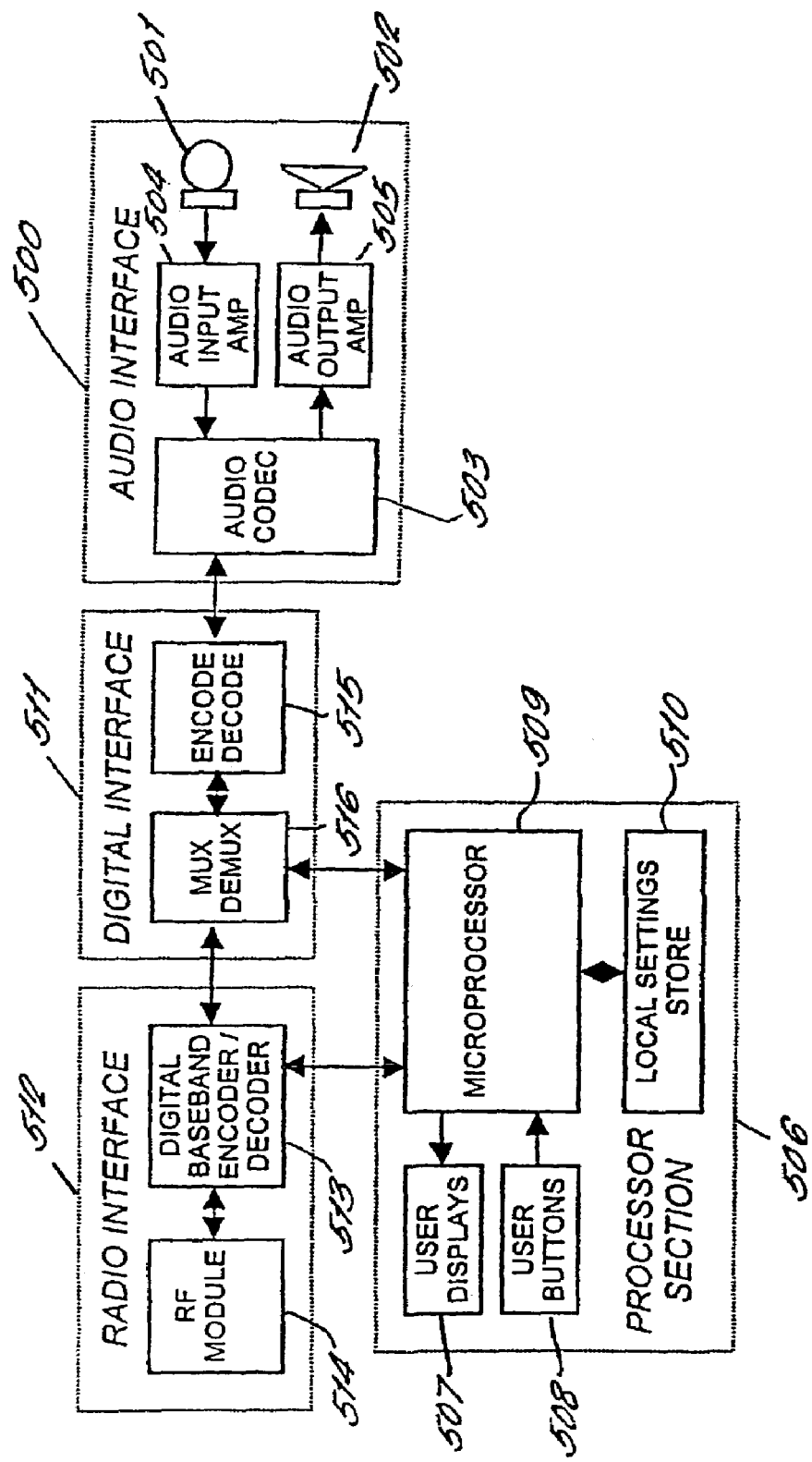
FIG. 10 is a block diagram of a mobile user station.

FIG. 10 illustrates a user station in the form a wireless mobile station capable of communicating with the active antenna described with reference to FIG. 8A. The user station may take the form of a mobile belt pack to be worn by a user and includes an audio interface 500 containing a microphone 501 and loudspeaker or earpiece 502 connected to an audio codec 503 via audio input and output amplifiers 504, 505. The belt pack may also comprise a processor section 506 providing user displays 507 and user buttons 508 associated with a microprocessor 509 operating with a local settings store 510. The processor section 506 operates to provide general control and housekeeping of the mobile station as well as user interface functions via the user displays 507 and user buttons 508. The microprocessor 509 generates a data stream which is communicated to the base station over the digital communication link established with the mobile station. A digital interface 511 processes the digital audio and data signals received from and transmitted to the base station via a radio interface 512. The radio interface 512 incorporates a digital base band codec 513 and an rf module 514.

In the audio interface 500 conditioned audio signals (which may be from one or more sources) are fed to the audio codec 503 which converts analogue signals into a linear digital format which are passed to the digital interface 511. In the reverse direction, linear digital audio signals received from the digital interface 511 are converted in the audio codec 503 into analogue form for output via amplifier 505 and the earpiece or loudspeaker 502.

Digital interface 511 is responsible for processing of the digital audio and data signals that may be received from or transmitted to the base station via the radio interface 512. The digital audio signal from the audio interface 500 is compressed by codec 515 and the compressed audio is then multiplexed in the Mux/Demux unit 516 with the data stream from the microprocessor 509 in the processor section 506. This combined signal with a maximum data rate of 64 Kb/s is passed to the radio interface 512 for transmission to the base station. Similarly, a 64 kb/s data stream received from the base station is passed from the radio interface 512 to be demultiplexed in the Mux/Demux unit 516 into its digital audio and data components. The data is passed to the processor section 506, whereas the digital audio is decompressed to linear digital form by codec 515 before supplying to the audio interface 500.

Importantly, the radio interface 512 in association with the microprocessor 509 additionally performs the required quality of service management and link management operations to maintain the required communication link between the mobile station and the base station. This may be according to any appropriate standard low power digital radio communication protocol, such as the DECT protocol, or the Bluetooth protocol. In either of these two examples, the radio interface 512 continuously checks for a better radio channel amongst those available to it. If a better channel is detected the mobile unit is arranged to send a message to the active antenna at the base station to initiate negotiations for a channel handover. This handover could involve moving to a different channel with the same antenna or to a channel on another antenna. Importantly, the base station is effective to track any channel handover with a particular mobile station so that the crosspoint processor is reprogrammed accordingly to maintain the desired connections and set up parameters for the user of the mobile station which is transferring from one channel to another.

In operation, when a mobile station is first detected by the base station, for example following power up, the mobile station and the, or one of the, active antennae are effective to allocate a channel for communication with the mobile station. In the example described, the allocated channel would be one of the five channels (Ch1 to Ch5) handled by a particular active antenna. If there are several active antennas available, the one selected by the system would be the one providing the best channel performance at the mobile station.

It is an important feature of this embodiment of the invention, that any particular mobile station could be used by any user, that is to say a user having any particular set of preferences or "personality data" as defined previously. The user uses the buttons 508 of the mobile station to indicate the identity of the user. This identity information is transmitted by the mobile station to the base station, in which the user identity is correlated with the specific system channel being used for communication with the mobile station of that user.

As explained previously, one antenna interface 602 (FIG. 7) can, in this example, maintain discrete communication channels with up to 25 mobile users. Only 25 time slots of the E1 frame are used for audio. The 25 different communication channels would correspond to five time slots in each of five blocks of six time slots each in a full E1 data frame as illustrated in FIG. 9B. In addition, five further time slots of the data frame, comprising the sixth time slot of each block of six slots, is used for synchronisation and control data. The codec 650 in the antenna interface 602 has, therefore, 30 individual compression codecs, one for each of the 30 used time slots of the E1 data frame. The codec 650 interfaces the E1 data frame with the TDM input and output data buses 632 and 634 of the base station, so that each time slot of the E1 data frame is permanently associated with a unique time slot on the TDM buses 632 and 634. It should be understood that the buses 632 and 634 would normally provide a larger number of time slots than the E1 data frame, and in this example, sufficient time slots may be available on the system buses of the base station to enable the base station to accommodate 200 full duplex communication channels with respective user stations.

It should be appreciated, therefore, that the base station, as illustrated in FIG. 7, could incorporate a further antenna interface providing communication with up to a further 25 individual user stations. The 30 time slots from the E1 frame associate with the additional antenna interface would then be uniquely associated with a further 30 time slots on the system data buses, different from the 30 time slots associated with an antenna interface 602.

In general, it can be seen therefore, that each particular radio channel which can be used for communication with a user station will be uniquely associated with a particular time slot on the system bus. The master processor of the base station operates, on receipt of a user identification data from a user station communicating via an allocated radio channel, to correlate the personality data for that user with the channel allocated by the system to the user station of that user, and hence to a particular time slot of the main system buses. Similarly, the master processor 603 correlates all the other users which have "logged on" to the system with time slots on the main system buses corresponding to the allocated radio channel for the respective user. The cross point processor 601 can then be controlled by the master processor 603 to set up appropriate cross point links between the correlated time slots of the main system bus, to provide the required communication links between the users.

Referring again to FIG. 7, the base station control unit illustrated also comprises a digital trunk interface 612, an analogue trunk interface 600 and a bus extension interface 622, as well as an internet interface 658 in the master processor 603. These interfaces may be used for connecting multiple base stations together to expand the intercom system geographically and/or in terms of the number of available mobile stations. Connections between base stations may be set up in three different ways.

For base stations which are physically close to each other, they may be connected together via bus extension interfaces 622 on each base station. These essentially interconnect the input buses 632 and control buses 636 of the two base stations so that the two stations essentially operate as one. The bus extension interface 622 comprises a data interface 624 with a message stack 630 buffering control data from or to the control bus 636. Audio data on the audio input bus 632 is shared with the audio input bus of the other base station via a TDM audio interface 626 and a TDM frame store 628.

The second method of interconnecting two base stations is via the analogue trunk interface 600. The interface 600 comprises an audio interface 604 which receives audio data from the output bus 634 via an A-to-D and D-to A converter 608, and similarly feeds received analogue audio to the input data bus 632 via the converter 608. Control data between the control buses 636 controls operation of the converter 608 via a microprocessor 610, which in turn supplies corresponding control data to the other base station via a data interface 602.

Instead of providing the data interface 602 in the analogue trunk interface 600, the data transfer can be performed by means of the ethernet interface 658 directly between the microprocessors 656 of the master processors 603 of the two base stations.

A third method of connection is via digital trunk interface 612 on each base station. This is arranged essentially to create an E1 type interface between the base stations, enabling 30 channels of data to be communicated between the base stations. All 30 slots of the E1 frame can be used for audio in the links between base stations. For this purpose, the digital trunk interface 612 comprises a compression codec 618 an E1 interface 620, together with a microprocessor 616 buffered by a message stack 614. When using a digital trunk, control data to be communicated between base stations can either be multiplexed with the audio data and sent over the E1 link, so that only 25 slots may be available for audio, or it can be sent over the Ethernet link as for the analogue trunk, whereupon all 30 E1 slots can be used for audio. If more than 25 (or 30 as the case may be) channels of data are to be connected between the two base stations, additional codec and E1 interfaces may be employed.

When multiple base stations are connected together by any of the above techniques, the master processors 603 in each base station ensure that the correlation matrix store 660 contains correlation data for each of the users of the whole system. Thus any updates to the correlation matrix store on one base station, e.g. caused by a mobile station being reallocated to a different channel, is communicated to the other base station or base stations to provide corresponding updating of the respective correlation matrix store in the master processor of each other base station. In this way, each base station keeps track of the channel, and hence main system bus time slot allocation of each user of the system, so that the cross point processors of each base station seamlessly follow channel changes and maintain the desired communication links between users.

The possibility was mentioned above of a user station initiating a channel change on detecting a better available channel in the digital radio system. The better channel could be another channel from the same active antenna (five different channels being available in the example described). However, the requested new channel could be a channel of another active antenna from the same base station, or even active antenna from a different base station. In any case, when a base station receives a request from a particular user station to be allocated to a different channel, the new channel is assigned to the user associated with the user station in addition to the existing channel assignment, so that the cross point processor sets up the additional communication links simultaneously for the old and new channels of the user station requesting transfer. If the new requested channel is accessed via a different base station, because the correlation matrix store data, including the new requested channel data, is shared between all base stations, the cross point processor of the new base station sets up the appropriate communication links for the new requested channel, so that input and output data from the user interface requesting change is simultaneously received on the new channel via the appropriate active antenna and antenna interface of the second base unit.

After a short period, sufficient to ensure that the new channel has been established, the system releases the original channel, so that subsequent communications with the user station continue only on the new channel.

Importantly, this enables full roaming capability of mobile user stations without loss of the required preferences and voice connections desired for the user of the mobile station.

For interconnections between base stations via trunk interfaces, the digital trunk interface 612 may provide only a smaller number of discrete digital channels for communication between base stations, than the total number of system users. Similarly, the number of audio analogue channels provided by the analogue trunk interface may be limited. In this case, each available channel of the trunk interface is assigned to a unique time slot of the system buses in each base station. The master processor of each base station has, as explained above, a map of the users which are intended to be in communication with each other, correlated with the allocated time slots for the user stations of those users. In a particular base station, at least the radio channels available via active antennae connected to that base station have a one to one correspondence with system time slots of the buses 632, 634 and 636 of the respective base station. The digital-trunk interface 612 connecting the base station to a second base station, for example via an E1 interface, provides 30 time slots in the communication link between the two base stations and these time slots should have a one to one correspondence with additional time slots in the system buses 632, 634 and 636.

When the master processor 603 identifies a communication link to be set up with a radio channel associated with a different base station, the cross point processor 601 of the first base station is controlled to apply the required digital output signal to one of the time slots on the output bus 634 associated with the digital trunk interface. At the same time, the master processor 603 signals the other base station, either by the ethernet interface 658, or by means of control data on the control bus 636 sent via the digital trunk interface 612, to indicate to the other base station the target radio channel for the data on the particular E1 interface time slot of the digital trunk interface. The other base station receiving the audio from the first base station applies it to its input bus in the time slot uniquely associated with the E1 time slot of the digital trunk. The audio is then applied by the crosspoint processor of the other base station to an appropriate output bus time slot mixed as required with other audio sources from other mobile units currently handled by the other base station or received over other trunk lines from further base stations.

In the above description, the "personality data" of each user of the intercom system is described as predefined and stored in the correlation matrix store 660 of the base station. However, in practice, the personality data, including data defining the desired user connections, may be altered by operation of user buttons 508 on the user station of a particular user. For example, if the producer wishes to speak privately with a particular other member of the production staff, the producer may select an appropriate code for the other user on the user buttons of the producer's mobile station or belt pack. The button selection is transmitted by the mobile station to its base station and the data alters the set up in the correlation matrix store so that the cross point processor sets up the desired new connection.

It should also be understood that the personality data of each user may include the degree of control which that user is entitled to. For example, only selected buttons on the belt pack of the user may be enabled. This user station set up data is retrieved from the correlation matrix store of the base station and transmitted to the user station. Whereupon the user station microprocessor applies the required settings enabling buttons, and providing displays, as appropriate. The user data is supplied from the base station in response to the user identification data transmitted by the user station at the start of a session.

The invention claimed is:

1. Intercom apparatus comprising a base station, said apparatus being capable of selectively establishing voice communication connections among a plurality of user stations and said base station being capable of communicating with each said user station on a respective channel, said base station including:
    (i) a data store containing
        (a) respective user identification data identifying each of a plurality of users of the apparatus, and
        (b) respective personality data, for each identified user, including the user identification data of each other user intended to have a voice connection with said identified user;
    (ii) a user and channel correlator receiving, from each said user station, data correlating with the user identification data of the respective user of the respective user station, and correlating the user identification data of the respective user with the respective channel of the user station of the respective user; and
    (iii) a crosspoint processor responsive to said user and channel correlator to set up voice communication links amongst said channels to provide voice connections between users in accordance with said personality data.

2. Apparatus as claimed in claim 1, arranged for wireless communication with a plurality of wireless mobile stations on respective channels among a plurality of possible wireless channel said base station further comprising
    a channel allocator controlling allocation of said respective channels.

3. Apparatus as claimed in claim 2, wherein said channel allocator is operative, in response to detecting a mobile station, to allocate an unused channel for communication with said detected station, said user and channel correlator correlating said user identification data received from said detected station with said allocated channel.

4. Apparatus as claimed in claim 3 wherein said channel allocator is further operative, in response to a predetermined wireless transmission parameter, to reallocate a different wireless channel to any of the mobile stations, said user and channel correlator being responsive to said channel reallocation to correlate said user identification data from said one of the mobile stations with the unit allocated different wireless channel.

5. Apparatus as claimed in claim 3, wherein said channel allocator is responsive to a new channel request from a mobile station.

6. Apparatus as claimed in claim 1 wherein said base station includes an interface for communicating data with a further said base station, said data including at least said user personality data.

7. Apparatus as claimed in claim 6, wherein said base station interface is arranged to provide voice communication links between base stations, whereby voice communication connections can be set up between user stations communicating with different base stations.

8. Apparatus as claimed in claim 1 comprising said base station in combination with at least one user station.

* * * * *